(12) United States Patent
Al-Askari

(10) Patent No.: US 6,483,795 B1
(45) Date of Patent: Nov. 19, 2002

(54) DRIVE TRAY

(76) Inventor: Raad Al-Askari, Nelkenstrasse 4, CH-8400 Winterthur (CH)

( * ) Notice: Subject to any disclaimer, the term of this patent is extended or adjusted under 35 U.S.C. 154(b) by 0 days.

(21) Appl. No.: 09/473,096

(22) Filed: Dec. 28, 1999

(51) Int. Cl.$^7$ .................... G11B 17/04; G11B 17/035
(52) U.S. Cl. ............................................ 369/75.2
(58) Field of Search ................ 369/75.1, 75.2, 369/77.1, 77.2

(56) References Cited

U.S. PATENT DOCUMENTS

| | | | |
|---|---|---|---|
| 5,105,414 A | | 4/1992 | Funabashi et al. ......... 369/75.2 |
| 5,982,736 A | * | 11/1999 | Pierson ....................... 369/273 |

FOREIGN PATENT DOCUMENTS

| | | | | |
|---|---|---|---|---|
| DE | 297 08 978 U1 | | 8/1997 | |
| EP | 0 375 988 A1 | | 7/1990 | |
| EP | 0 576 253 A2 | | 12/1993 | |
| EP | 0 609 617 A2 | | 8/1994 | |
| EP | 0 927 996 A2 | | 7/1999 | |
| GB | 2343784 B | * | 8/2001 | ............ G11B/7/24 |
| JP | 01007362 A | * | 1/1989 | ............ G11B/17/24 |
| JP | 01122060 A | * | 5/1989 | ......... G11B/17/035 |
| JP | 01303667 A | * | 12/1989 | ............ G11B/17/08 |
| JP | 02076159 A | * | 3/1990 | ......... G11B/17/035 |
| JP | 04238150 A | * | 8/1992 | ............ G11B/17/04 |
| JP | 07021755 A | * | 1/1995 | ............ G11B/33/02 |
| JP | 08293146 A | * | 11/1996 | ............ G11B/17/04 |
| JP | 08293147 A | * | 11/1996 | ............ G11B/17/04 |
| JP | 09293367 A | * | 11/1997 | ............ G11B/33/02 |
| JP | 10092079 A | * | 4/1998 | ............ G11B/17/04 |
| JP | 10106096 A | * | 4/1998 | ............ G11B/17/03 |
| JP | 11232749 A | * | 8/1999 | ............ G11B/17/04 |
| WO | WO 99/12159 | | 3/1999 | |

* cited by examiner

Primary Examiner—William Klimowicz
(74) Attorney, Agent, or Firm—Weingarten, Schurgin, Gagnebin & Lebovici LLP

(57) ABSTRACT

There is put forward a tray for a CD/DVD drive. The usual drive tray includes a receiving location for CDs with a normal format and also for mini-CDs. The receiving location is formed by a receiving surface. The receiving surface is provided with a multitude of pin receivers. By way of positioning pins which may be inserted into the pin receivers there are formed bearing edges. Special shapes of CD/DVD may now be precentered and held by the positioning pins until the drive tray is retracted into the drive and the drive is ready for operation.

10 Claims, 4 Drawing Sheets

DRIVE TRAY

BACKGROUND OF THE INVENTION

The invention relates to a tray for a CD or DVD drive and to an auxiliary means for using the tray according to the preamble of the independent patent claim.

Usual CD drives for reading and processing data, audio and video compact disks comprise a tray for loading CDs. This tray has at least one tray base with a rectangular outline. The tray is insertable into the drive into the tray receiver. The tray base is provided with a slot-shaped relief in whose region during the operation, the drive plate may rotate with the centering pin and the read device may move. The tray base comprises a first circular deepening with a diameter which corresponds to the standardised diameter of the usual CDs. This circular deepening forms an accommodation centering for loading a CD. If the CD is loaded, the tray is retracted into the drive, whereupon the drive plate with the centering pin from below advances into the central opening of the CD. Within the first circular deepening there is located a second circular deepening with a smaller diameter which corresponds to the mini-CD standard. Into this second circular deepening there may be applied a mini-CD before the tray is retracted into the drive. These deepenings each form a circumferential shoulder on which the CD comes to bear on loading. By way of this the CD is precentered in the tray so that it may not displace on retraction into the drive and may be correctly acquired by the centering pin and the drive plate. With these drives one may apply all normal CDs and at all events DVDs. Likewise it is possible to play so-called shaped CDs, as compact disks with a special shape, as long as these may with at least three outer edges come to bear on the mentioned shoulders and thus may be loaded in a pre-centered manner. There are also those drive trays which only comprise the first positiong shoulder, but not the second positioning shoulder for mini CDs. These therefore have an approximately continuous first rest surface for the loaded CD.

Recently CDs have appeared on the market with special shapes such as calling cards, hearts and others. These special shapes often have a format which makes it impossible for the three outer lying edges to be able to brought to bear on one of the shoulders. They are usually larger than the diameter of a mini CD and smaller than the diameter of a normal CD.

BRIEF SUMMARY OF THE INVENTION

It is the object of the invention to specify a tray for a CD/DVD drive which permits apart from the known usual round CDs also the precentered insertion of those with special shapes.

This object is achieved as follows : The receiving location is formed by a receiving surface. The receiving surface is provided with a multitude of pin receivers. By way of positioning pins which may be inserted into the pin receivers there are formed bearing edges. Special shapes of CD/DVD may now be precentered and held by the positioning pins until the drive tray is retracted into the drive and the drive is ready for operation.

An additional advantage of the invention is that according to the invention various special shape CDs may be used.

BRIEF DESCRIPTION OF THE DRAWINGS

The invention is hereinafter described in combination with the drawings. There are shown.

DETAILED DESCRIPTION OF THE INVENTION

Figure 1:
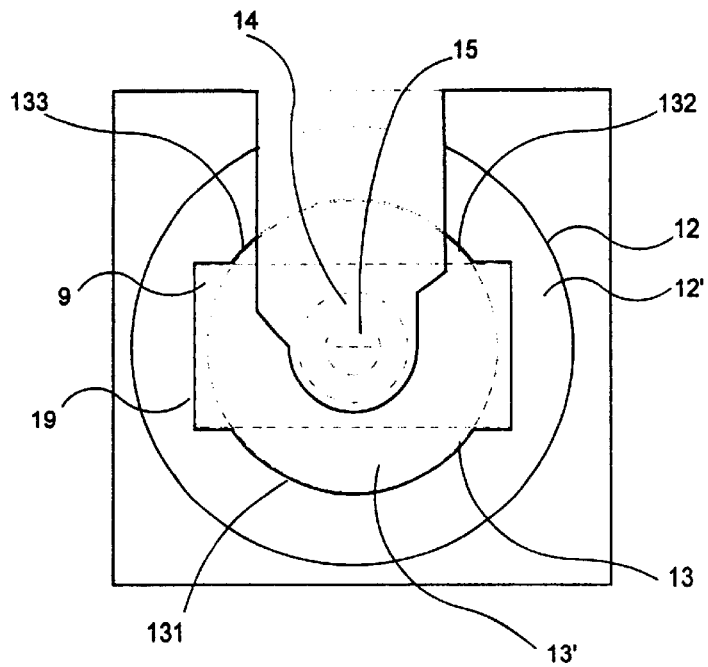
FIG. 1 a view of a tray according to the invention for a CD/DVD drive, additionally suitable for the use of calling card CDs.

A usual drive tray 1 for a CD or a DVD drive comprises a first circular rest surface 12 which is circumscribed by a first circular positioning shoulder 11. On insertion a normal size CD/DVD within the first positioning shoulder 11 is loaded and placed onto the first circular rest surface 12. It thus bears with a minimal play on this first positioning shoulder 11 and by way of this is precentered. On inserting the tray into the drive it may not displace and the accommodation on the drive plate 14 is securely guaranteed. As soon as the drive tray is retracted the drive pin 15 with the drive plate 14 is raised or pivoted upwards into the operating position. Then the CD/DVD lies on the drive plate and by way of this is set in rotation. Within the first rest surface 12 a circular, concentric and deeper lying second rest surface may be present. Between the first rest surface and the second deeper rest surface there is then located a second concentric circular positioning shoulder. This serves, analogously for the precentering of a mini-CD. From the drive side there is present a relief 10 for the drive plate 14, the centering pin 15 and the read/write device of the drive. This interrupts the circular positioning shoulder 11 on the one side on its circumference so that the positioning shoulder does not circumscribe a complete circle. This relief must be present so that the tray may be extended and retracted without hindrance.

The basic concept of the invention then lies in the fact that further positioning shoulders may be incorporated for loading CDs with particular shapes, such as for example calling card CDs. These lie in their flat extension within the positioning shoulder 11 on the rest surface 12. They must however be able to be loaded into the drive tray such that during the insertion of the tray they do not slide and thus at the same time are precentered and held such that the drive pin may move into the central drive opening of the CD/DVD.

According to FIG. 1 a tray 1 for a CD or a DVD drive comprises a first circular rest surface 12' which is surrounded by a first circular positioning shoulder 12. For precentering a normal size CD/DVD this is loaded within the positioning shoulder 12 onto a first circular rest surface 12. It thus bears with a minimal play on this first positioning shoulder 12. On inserting the tray into the drive it may not displace and the accommodation on the drive plate 14 is securely guaranteed. Within the first rest surface 12' there is located a circular, concentric and deeper lying second rest surface 13'. Between the first rest surface 12' and the second deeper rest surface 13' there is located a second concentric circular positioning shoulder 13. This serves analogously for the precentering of a mini-CD. From the drive side there is present a relief 11 for the drive plate 14, the centering plate 15 and the read/write device of the drive. This interrupts both circular positioning shoulders 12, 13 on one side on their circumference so that the positioning shoulders do not circumscribe a complete circle. The relief must be present so that the tray may be extended and retracted without hindrance.

The basic concept of the invention then lies in forming the second positioning shoulder 13 differently, and specifically such that further positioning shoulders 19 for CDs with special shapes such as for example calling cards may be incorporated. These lie in their flat extension between the first and the second positioning shoulder 12, 13.

For this the second circular positioning shoulder 13 is separated into at least two, but preferably into three shoulder segments 131, 132, 133. These three shoulder segments 131, 132, 133 are separated so far from one another that a loaded CD therebetween may be unambiguously positioned. This means that the second positioning shoulder 13 no longer approximatly completely embraces a loaded CD. In the extreme case it is even sufficient to form the three shoulder segments 131, 132, 133 by way of three cams standing on a tray base forming the second rest surface 13'.

In a simplest version, shown in FIG. 1, a third positioning shoulder 19 for receiving calling card CDs with the usual size for calling cards is incorporated in the tray 1. The second rest surface 13' is then not only bordered around by three shoulder segments 131, 132, 133, but also additionally by in each case four edges of a rectangular deepening, which in shape and surface correspond to a calling card. It is clear that the shoulder segments 131, 132, 133 and the part elements of the third positioning shoulder 19 complement one another such that therebetween there is formed a continuous free second rest surface 13'.

Figure 3:
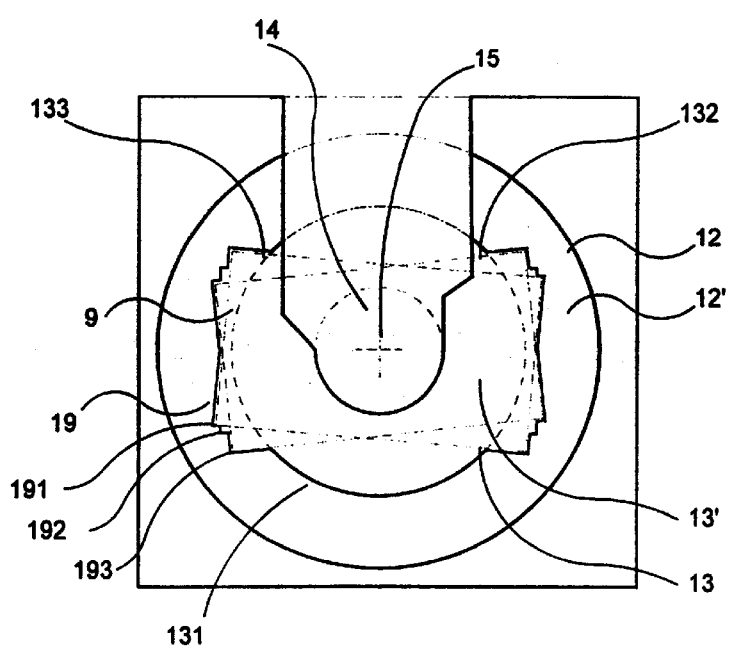
FIG. 3 a tray in the second variation in a plan view.

In FIG. 3 the first variation of FIG. 1 is expanded inasmuch as the shaping and arrangement of the third positioning shoulder 19 for the three different shapes is provided for three differing formats of calling card CDs. Thus calling card CDs with various widths and the same length may be used. This may prove advantageous since the usual size of calling cards differs somewhat in differing countries. According to the representation in FIG. 3 the third positioning shoulder 10 is divided into individual shoulder elements 191, 192, 193. Each shoulder element consists basically of shoulders for accommodating the four edges for in each case one size of calling card CD. The four shoulder elements 191 for the one format are, with respect to the four shoulder elements 192 of the second format, rotated about a second vertical axis about a certain relatively small angle. This likewise applies to the four shoulder elements 193 for the third format and likewise to any occuring further ones.

Figure 2:
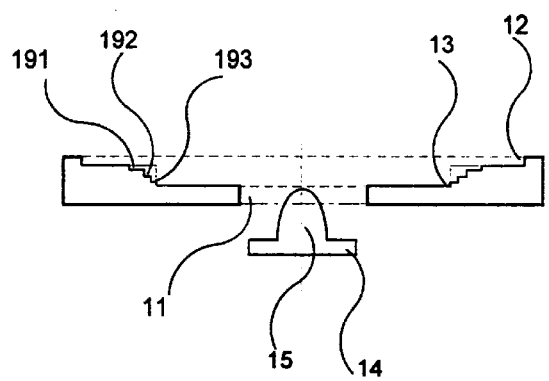
FIG. 2 such a tray in a second variation in a sectioned plan view.

A further possibility for graduating the shoulder elements 191, 192, 193 for slightly differently dimensioned formats which amongst each other are similar, as this is for example the case with the CD calling cards, is shown in FIG. 2 in a view of a cross section. Here the graduation of the shoulder elements 191', 192', 193' is effected not by way of a horizontal mutual rotation of the shoulder elements about a common vertical axis, but by way of vertical graduation. With this there arises at least the beginnings for each format an individual rest surface or at least one rest edge.

Figure 4:
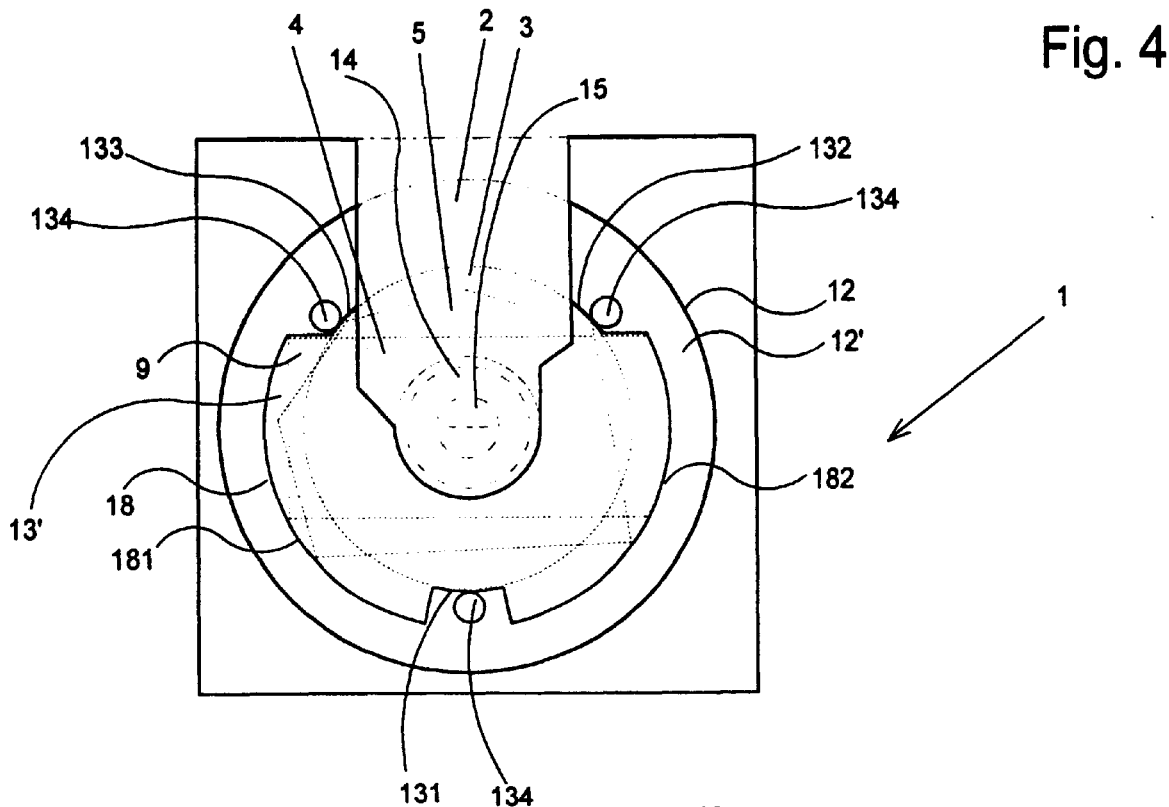
FIG. 4 a third variation with expanded possibilities, in a plan view.
Figure 5:
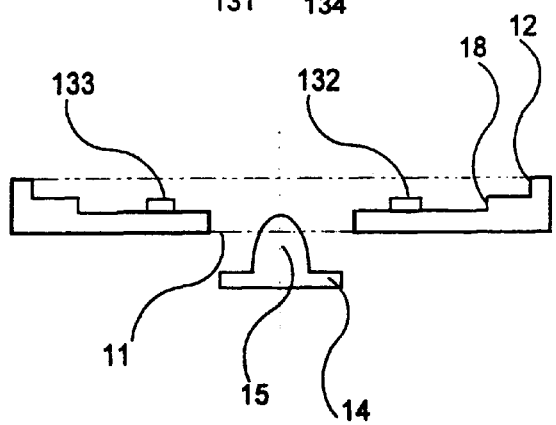
FIG. 5 in a sectioned view.

An almost universal possibility is represented in FIG. 4 in a plan view and in FIG. 5 in a view of a section. With this variation the first, the second and the third shoulder elements 131, 132, 133 for accommodating mini-CDs only consist of very short pieces. For this there is arranged a fourth positioning shoulder 18. It is located according to the purpose, between the first positioning shoulder 12 and the second positioning shoulder 13. The second rest surface 12' now extends planar in the surface beyond the second positioning shoulder 13 up to the fourth positioning shoulder 18.

In the preferred embodiment shown here the fourth positioning shoulder 18 consists of two shoulder elements 181, 182 which describe actual segments of a circle. Between the two shoulder elements 181, 182 in each case there is located one of the shoulder segments 131, 132, 133 of the second positioning shoulder 13. The diameter of the circle circumscribed by the two shoulder elements 181, 182 with this corresponds to the diagonal of a usual calling card CO.

Figure 6:
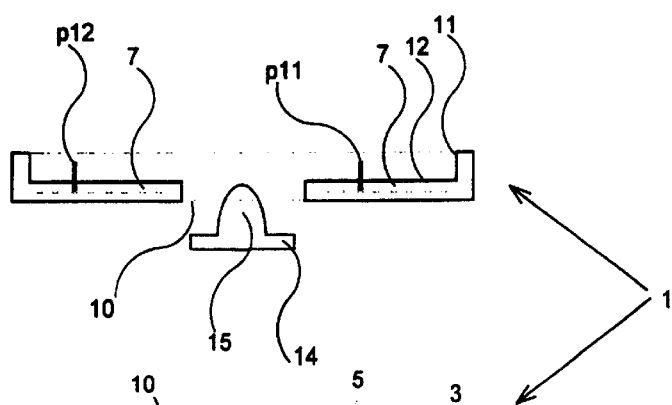
FIG. 6 a sectioned view through a drive tray according to the invention, of a variation according to FIG. 7.
Figure 7:
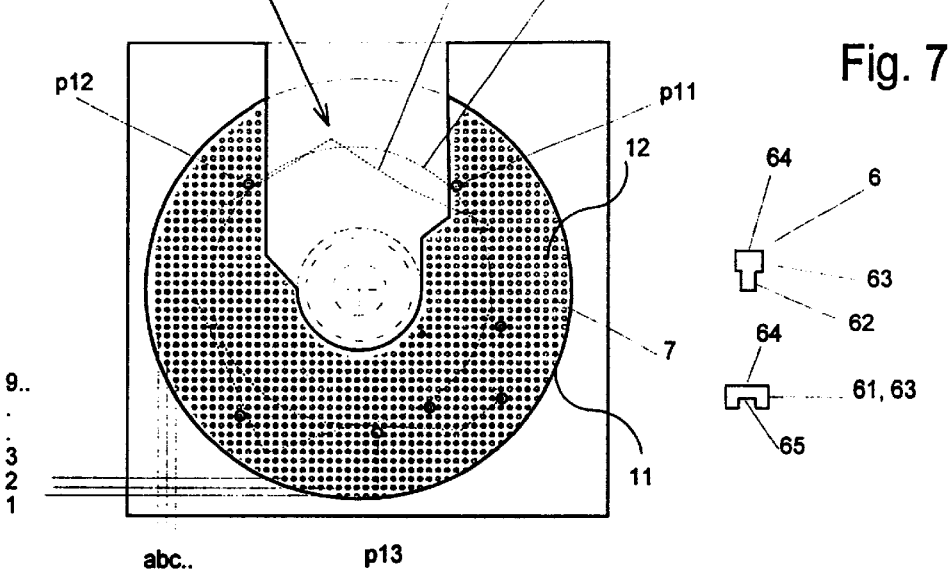
FIG. 7 a plan view of a further variation of a drive tray.

A particular variation based on the same basic concept is represented in the FIG. 6 in a cross section and in FIG. 7 in a plan view. The shoulder segments 131, 132, 133 of the second positioning shoulder 13 are here designed as simple cams 134 standing on the second rest surface 13'. The positioning shoulder is then formed by the radially inwardly facing edge of the cams 134. The cams 134 are located therefore directly outside the respective periphery of the CD to be loaded or the shoulder edge which they form. A mini-CD on loading then comes to lie simply between the cams 134.

This embodiment form permits a prepositioning not only of a normal CD/DVD, mini-CD, calling card CD but also a multitude of special shapes 5, since the free useable region of the second rest surface 13' is very large. Additionally a combination of these preferred variations with graduated positioning shoulders according to FIG. 2 is possible.

The basis of this variation represents a tray for CDs or DVDs, which only comprises a first positioning shoulder 11 and the first rest surface 12. The first rest surface 12 is provided with a multitude of regularly or irregularly arranged pin receivers 7. The pin receivers 7 are either admitted in the rest surface 12 as small pocket bores or are placed thereon as retaining naps. The bearing edges 63 necessary for loading a CD/DVD with special shapes are produced by positioning pins 6. The pins 6 may be short cylindrical bolts. The bolts may comprise a cap 64 and a spike 62 for insertion into the pocket holes. With this the lateral edges of the cap 64 form the bearing edges 63. With the solution with the pin receivers 7 in the form of retaining naps the pins 6 consist only of caps 64 which on the lower side comprise a recess 65. With the recess 65 they are stuck onto the naps. The positioning pins 6 are then releasably arranged on the rest surface 12.

The decisive flexibility for the application of the most varied of special shapes of CDs/DVDs is obtained in that one inserts or sticks on or perhaps adheses on a necessary number of pins 6 into those pin receivers 7, so then the CD/DVD indeed is held centered between the bearing edges 63 on loading. It is recommended to form the arrangement of the pin receivers regularly and to provide them for example with printed information for the position. This may for example be effected similarly as with a chessboard with in each case a pin receiver of a letter/number combination (A/1 . . . Z/99). To the special shape CD/DVD there may be added the information as to which positions of pin receivers 7 are to be provided with pins 6. By way of this anyone may correctly apply the pins 6 for the pre-centering for each special shape. This information may be printed on the CD/DVD or added in the cover. So that also the usual mini-CDs may be simply loaded it is recommended on the first rest surface 12 to mark a circle which corresponds to this circumference. Therefore then simply at least three pins 6 are placed into pin receivers 7 just outside this circle.

Until now the discussion has only concerned the accommodation of CDs or DVDs. New generations of such drives comprise trays with exchangeable tray bases. It is evident that also such a loadable tray base may be provided with pin receivers 7.

Figure 8:
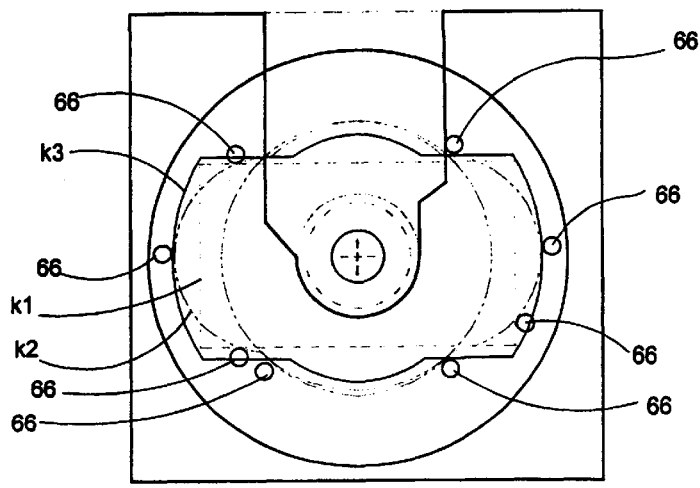
FIG. 8 a plan view of a further variation of a drive tray.

In FIG. 8 there is shown a tray base with positioning caps 66 rigidly arranged with respect to the rest surface 12. The basis of this embodiment is the same as that described in combination with FIG. 2. For the most common special shapes of CDs, DVDs in each case a contour marking k1, k2, k3 is visibly arranged. The contour markings k1, k2, k3 etc. are incorporated as fine lines, for example printed colored or as fine grooves. The may be co-produced already on manufacture. In the region of all important contour markings there are incorporated positioning pins 6 in the form of positioning caps 66. The positioning caps 66 laterally comprise likewise bearing flanks 62. Additionally on the upper side there may be present a convexly curved rest surface 68. They are provided with a flat lower adhesing surface 67 so that they may be easily adhesed onto the suitable locations. The positioning caps 66 may however already on manufacture of the tray base be moulded to this in one piece as naps. On loading, a special shape CD, DVD is simply loaded within the fitting contour marking between the positioning caps 66 before the tray is retracted into the operating position. CDs, DVDs with a larger base surface, as with the usual round ones, then simply lie on the convex rest surface 67 until the tray is retracted. The convex rest surfaces 67 may for this for example be coated with teflon.

Figure 9:
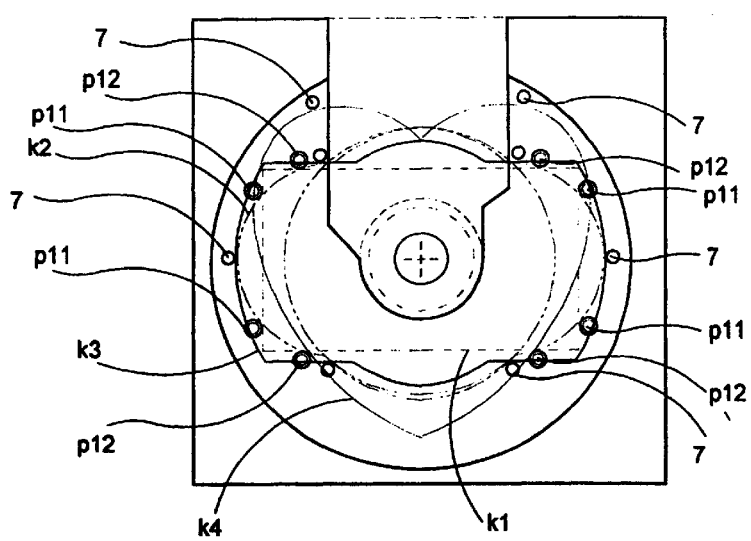
FIG. 9 a plan view of a further variation of a drive tray.
Figure 10:
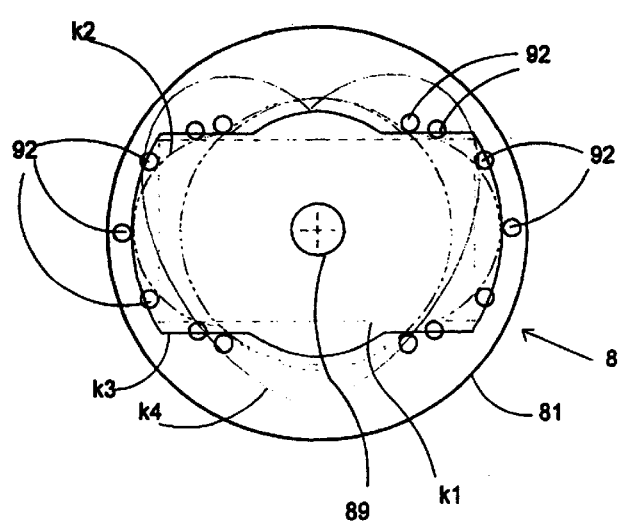
FIG. 10 a schematic view of a positioning template for use with the drive tray according to the invention.

The embodiment form according to FIG. 9 is a combination of the embodiments of FIG. 7 and FIG. 8. Also here the contour markings k1 . . . k4 are visibly incorporated on the tray base. In contrast to the previously described version there are present a number of pin receivers 7 on all important locations according to the deposited contour markings. Positioning pins or caps 6 are for the special shape CD, DVD placed on or inserted as with the embodiment according to FIG. 2. The special shape CD, DVD may be loaded thereon and subsequently the tray may be retracted.

For the man skilled in the art it is evident that the above described technical teaching in combination with complete trays extends also to exchangeable tray bases and in this context may also be applied to CD/DVD changers. With apparatus with CD/DVD change systems it is recommended to equip the drive with a rotation position indicator which at any time indicates the exact rotary position of the CD/DVD used in operation. By way of this the drive may be controlled such that the drive and thus the CD/DVD on completion of use is stopped in exactly the rotary position in which it was loaded. This means that when the CD is loaded and the drive pin is inserted into the drive opening of the CD/DVD, the rotary position is read and stored. The drive itself only then is started. For stopping again the drive is braked and stopped in exactly the rotary position which was stored before the starting. This permits also in a CD/DVD changer for memory media to be applied with special shapes in any manner.

In order to be able to universally use this drive tray as an accessory an auxiliary means in the form of a positioning template 8 may be useful. This is shown schematically in FIG. 3.

A simple embodiment of a positioning template 8 for positioning positioning pins 6 consists according to FIG. 6 and 7 of a circular base disk 81 which corresponds to a usual CD/DVD. On this then there are incorporated contour markings k1 . . . k4 which correpond to the special shape CDs, DVDs and which represent these. Positioning holes 92 are incorportaed at all important locations just outside the contour markings k1 . . . k4. The base disk may for example also be transparent of plexiglass. For use the positioning template 8 is loaded into the drive tray. It fits exactly into the receiving location for normal CDs. Subsequently positioning pins 6 are inserted into the positioning holes 92 according to the contour marking k1 . . . k4 and the positioning template 8 is again lifted from the drive. The special shape CD, DVD may then be loaded between the positioning pins 6. Then the drive tray is retracted and the CD, DVD is ready for operation. On changing to another special shape CD, DVD the positioning pins 6 are simply pulled out again.

Figure 11:
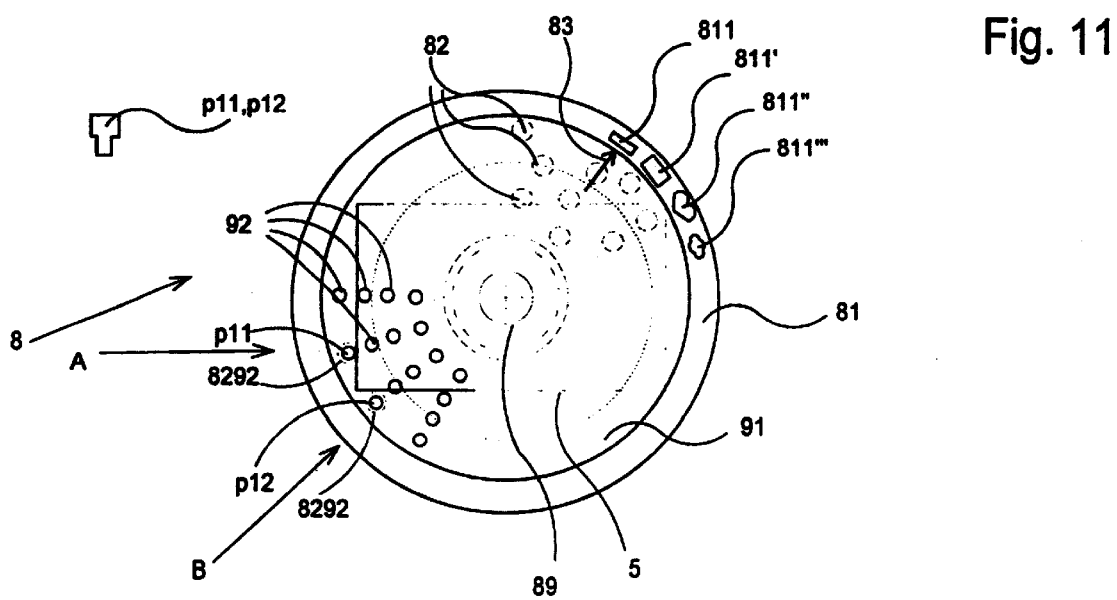
FIG. 11 a further variation of the positioning template.

A further variation of the positioning template 9 can be seen from FIG. 11. It consists of a circular base disk 81 which corresponds to a usual CD/DVD. Thereabove there is concentrically located an adjusting disk 91 which is likewise circular. The adjusting disk 91 has a somewhat smaller diameter than the base disk 81. The base disk 81 and the adjusting disk 91 are mutually rotatable about a central rotary bearing 89. On the base disk 81 along the circumference there are printed representations 811, 811', 811", 811'" or information with regard to the individual special shapes of CD/DVDs.

The base disk 81 is provided with a matrix of recesses 82 on approximately the whole surface which is covered by the adjusting disk 91. The adjusting disk 91 is provided with a matrix of positioning holes 92. The arrangement of the positioning holes 92 shows a somewhat different pattern to that of the recesses 82. The recesses 82 may comprise a somewhat larger diameter than the positioning holes 92. The purpose of these various arrangements on the respective disk 81 lies in the fact that at each rotary position of the adjusting disk 91 with respect to the base disk 81, a part of the number of positioning holes 92 are located over the recesses. By way of this there arises at these continuous positioning locations 8292.

On the adjusting disk there is printed a marking arrow 83. By rotating the adjusting disk 91 with respect to the base disk 81 the marking arrow 83 is adjusted to the desired pictogram of a CD/DVD with a special shape, which is to be loaded. With this adjustment then a number of positioning holes 92 lie over recesses 82 and clear a number of positioning locations 8292. Then the positioning template 8 is placed onto the rest surface 12 of the drive tray. With this pin receivers p11, p12 are located exactly below the positioning locations 8292. Now the positioning pins or positioning caps 64, 65 may be placed through the positioning locations 8292 or into the pin receivers p11, p12. The positioning template 8 is again removed. Now the CD/DVD with a special shape may be loaded between the inserted positioning pins 64 or caps 65. It is then held precentered by the lateral flanks of the positioning pins 64. Thereupon the drive tray may be retracted and the drive plate 14 with the drive pin 15 may be driven into the central drive opening of the CD/DVD. This is ready for operation. In FIG. 3 as an example positioning pins p11, p12 are shown in combination with the positioning A, B of a corner of a CD/DVD in the format of a calling card 5.

What is claimed is:
1. A tray for a CD or a DVD drive which for use of non-round CD/DVDs with special shapes which in their surface extensions are smaller than a normal CD and larger than a mini-CD and come to bear on a first circular rest surface with a tray base with at least one first circular rest surface and a first circular positioning shoulder for precentering a CD/DVD, and with a relief for a drive plate, for a centering pin and for a read/write device of the drive, characterized in that there is present a third positioning shoulder in the tray base within the first rest surface for precentering a non-round CD/DVD with a special shape, which in their surface extensions are smaller than a normal CD and larger than that of a mini-CD and come to bear on the first circular rest surface, wherein the third positioning shoulder forms at least three bearing edges for the non-round CD/DVD.

2. A tray according to claim 1, wherein the first circular rest surface is provided with a multitude of regularly or irregularly arranged pin receivers and wherein the third positioning shoulder is formed by at least three positioning pins which are insertable into or onto various pin receivers and which produce the bearing edges.

3. A tray according to claim 1, with a second circular concentric and deeper lying rest surface and with a second concentric circular positioning shoulder within the first rest surface for precentering a mini-CD, and with a relief for the drive plate, for the centering pin and for the read/write device of a drive, wherein the relief interrupts both circular positioning shoulders on one side on their circumference, and wherein the second circular positioning shoulder at at least one further location on the circumference is interrupted and by way of this is separated into at least two shoulder segments distanced from one another on the circumference.

4. A tray according to claim 3, wherein the circular positioning shoulder is separated into three shoulder segments distanced from one another on the circumference.

5. A tray according to claim 3, wherein between the shoulder segments of the second positioning shoulder and the first positioning shoulder there is arranged a third positioning shoulder.

6. A tray according to claim 1, wherein the third positioning shoulder is formed by in each case four wedges of at least one rectangular deepening which corresponds in shape and surface to a calling card.

7. A tray according to claim 6, wherein the third positioning shoulder is formed by several rectangular deepenings which are rotated to one another about a common central axis and which form several shoulder elements.

8. A tray according to claim 6, wherein the third positioning shoulder is formed by several rectangular deepenings, which are admitted into the first rest surface at different depths so that the third positioning shoulder is divided multi-stepped into several shoulder elements.

9. A tray according to claim 6, wherein between the first positioning shoulder and the third positioning shoulder there is arranged a fourth positioning shoulder and wherein the second rest surface tends planar up to the fourth positioning shoulder.

10. A tray according to claim 6, wherein the second and/or the third positioning shoulder is formed by way of in each case at least three cams standing on the second rest surface and arranged directly outside the respective circumference.

* * * * *

UNITED STATES PATENT AND TRADEMARK OFFICE
CERTIFICATE OF CORRECTION

PATENT NO. : 6,483,795 B1  
DATED : November 19, 2002  
INVENTOR(S) : Raad Al-Askari It is certified that error appears in the above-identified patent and that said Letters Patent is hereby corrected as shown below:

<u>Column 4,</u>  
Line 16, "CO" should read -- CD --; and

<u>Column 8,</u>  
Line 24, "tends" should read -- extends --.

Signed and Sealed this

Sixteenth Day of March, 2004

JON W. DUDAS  
*Acting Director of the United States Patent and Trademark Office*